Oct. 6, 1959 F. W. VAN LUIK, JR 2,907,620
POLAR PLOTTER
Filed July 30, 1954 2 Sheets-Sheet 1

Inventor:
Frank W. Van Luik Jr,
by Merton D Morse
His Attorney.

Oct. 6, 1959  F. W. VAN LUIK, JR  2,907,620
POLAR PLOTTER
Filed July 30, 1954  2 Sheets-Sheet 2
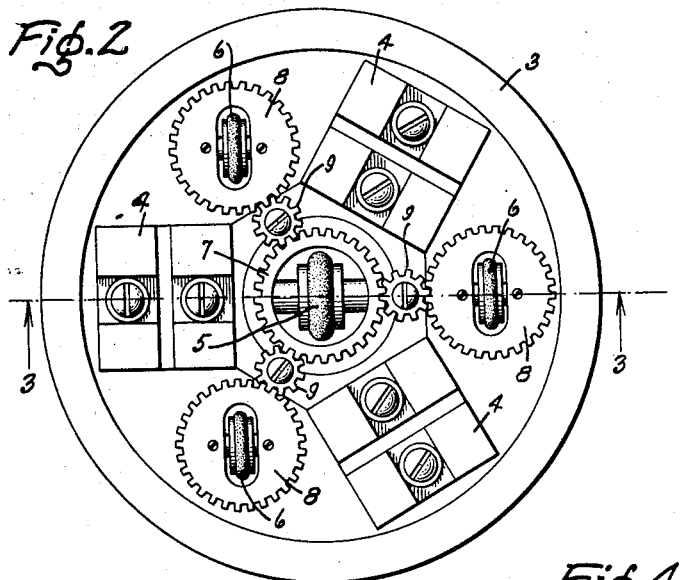
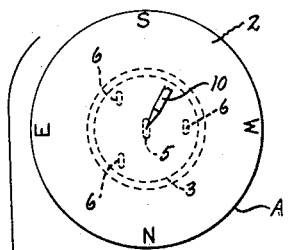
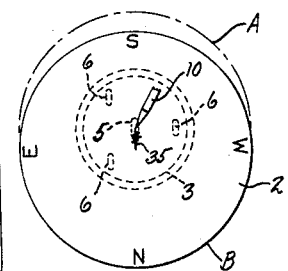
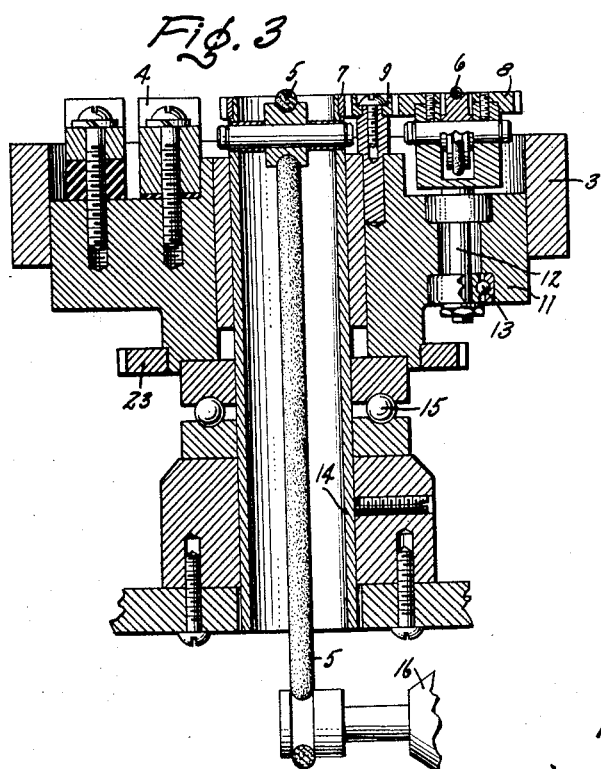
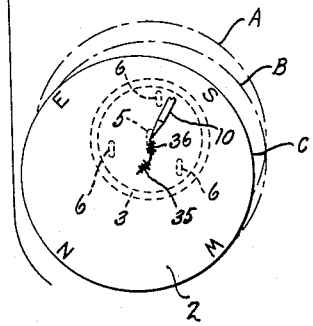
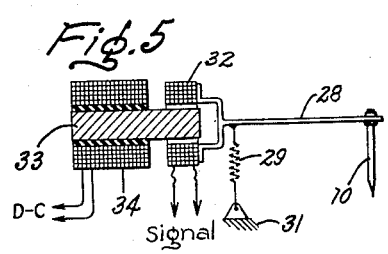
Inventor:
Frank W. Van Luik Jr.,
by Merton D Moore
His Attorney.

2,907,620

POLAR PLOTTER

Frank W. Van Luik, Jr., Schenectady, N.Y., assignor to General Electric Company, a corporation of New York Application July 30, 1954, Serial No. 446,797

16 Claims. (Cl. 346—8)

This invention relates to apparatus for plotting in polar coordinate form a vector quantity which may vary in angle and length, and more particularly to the use of such an apparatus in an odograph to plot the course of a moving object.

Odographs are well known in the art as devices that are used to plot the courses of moving objects. However, such devices have in the past been extremely complex mechanically and very expensive. Further, the tracing mechanism which was used to plot the course of the moving object hid the trace itself from the eye of the viewer for a considerable time until the moving object had moved some distance from its original position. The present invention is designed to be mechanically simple and small, so small that it can be easily carried by its operator. Moreover, this invention enables the operator to see the course trace of a moving object immediately, since the trace is never hidden from him by the plotting mechanism of the invention.

It is, therefore, one object of this invention to provide an apparatus that is small in size and mechanically simple for plotting in polar coordinate from a vector quantity.

It is another object of this invention to provide a polar plotting mechanism having a trace that is always visible to an observer.

It is still another object of this invention to provide an odograph which is portable and simple mechanically, and having a trace that is always visible to its operator.

Other objects and advantages will appear as the description of the invention proceeds.

In accordance with the invention, a polar plotting apparatus is disclosed in which the recorder chart upon which the trace is made is moved in a given direction at a rate proportional to the length of the vector quantity being plotted. The recorder chart is also rotatable about a given point in accordance with any changes in the angle of the vector quantity. Also, the marker pen for inscribing the trace is small and completely separate from the chart moving apparatus, and the operator's view of the trace is therefore never obscured. In order to achieve the turning of the recorder chart without impeding its movement in the given direction, a plurality of rotatable wheels are provided which revolve about the given point. These wheels are geared to a fixed gear which is disposed around the given point, and geared in such a way that the direction of rotation thereof is always parallel to the given direction. The wheels frictionally engage the recorder chart and as they revolve they turn the chart about the given point without impeding the forward progress of the recorder chart. The marker pen may also be moved at an angle with the given direction in accordance with other information to be recorded.

The features of this invention which are believed to be novel and patentable are pointed out in the claims which form a part of this specification. For a better understanding of the invention, reference is made in the following description to the accompanying drawings wherein like parts are indicated by like reference characters in which:

Fig. 2 is a top view of this embodiment of the invention, with the recorder chart removed;

Fig. 3 is a cross-sectional view taken along line 3—3 of Fig. 2;

Fig. 4 is a series of 3 sketches showing the movement of a recorder chart through a typical trace; and Fig. 5 is a view partially in cross section and partially in plan showing a device for varying the marker pen in accordance with intelligence that it is desired to record.

Figure 1:
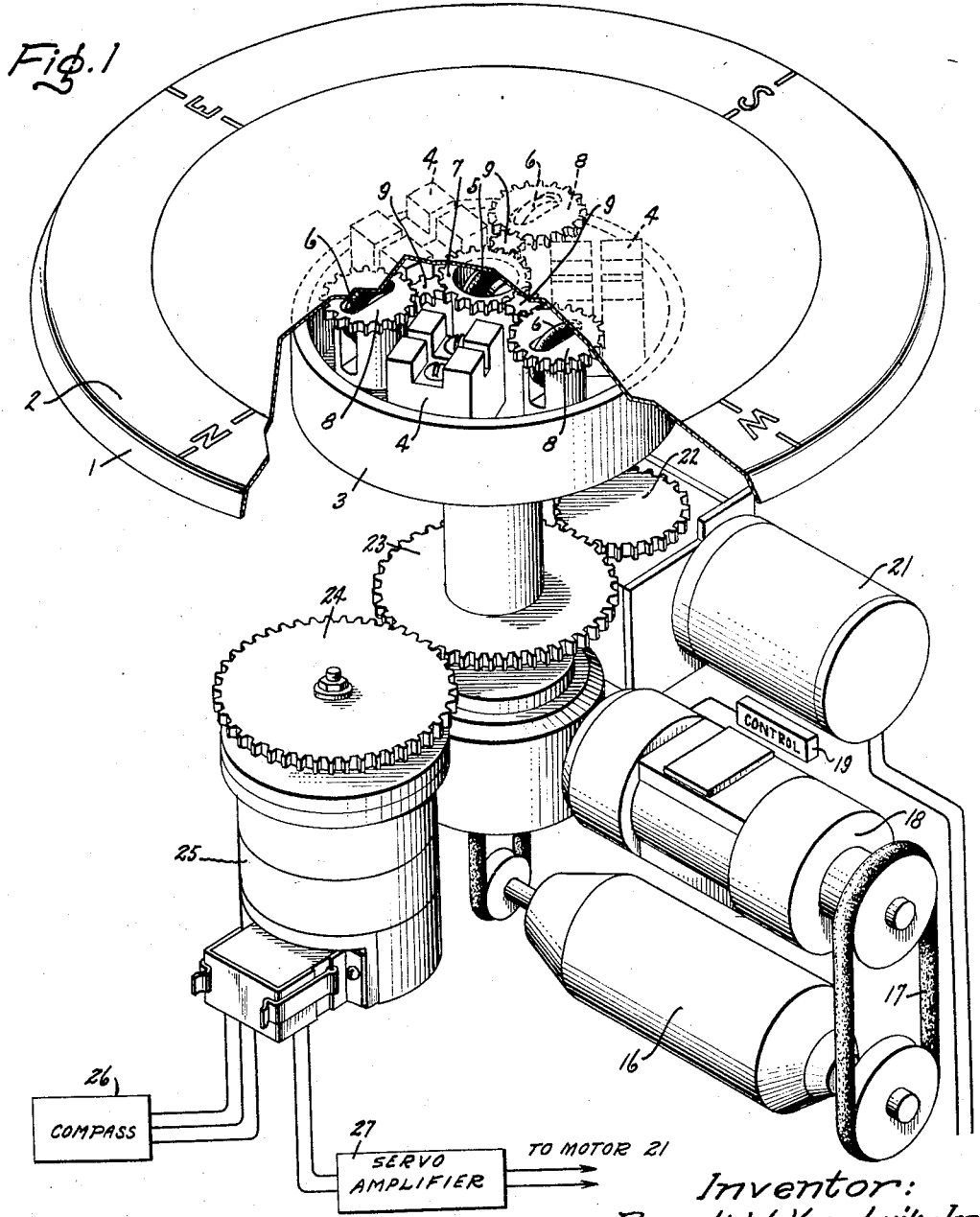
Fig. 1 is a perspective and block diagram showing one embodiment of the invention.

Referring now to Fig. 1, there is shown an odograph recorder constructed in accordance with the invention. In this figure there is depicted a recorder disk 1 having a chart 2 pasted thereon. Disposed underneath the recorder disk is a course ring 3 having three magnets 4 fastened thereto. Recorder disk 1 is made of any magnetic material, such as an iron composition, and magnets 4 serve to hold this disk down vertically; but of course, these magnets do not prevent any horizontal motion of the disk. Disposed in the middle of course ring 3 is a motor driven belt 5 which may be made out of rubber and is in frictional contact with the under side of the disk 1. Belt 5 only rotates in a plane extending in a given direction, and because of its frictional engagement with the disk serves to move the disk in said given direction. Also fastened to the course ring 3 are three rubber covered wheels 6 which are freely rotatable. Surrounding the upper portion of belt 5 is a fixed gear 7 coupled to three gears 8 which respectively surround wheels 6. This coupling is achieved through three gears 9 which are affixed to course ring 3 but are free to rotate. Magnets 4 serve to hold disk 1 firmly against wheel 6 and belt 5 so that the disk is always in frictional engagement with these elements; however, other types of holding apparatus such as a vacuum pump could replace the magnets.

The foregoing described elements constitute a device for moving a disk in accordance with any variations in angle and length of a vector quantity. This will be more clearly seen from Figs. 2 and 3, to which reference are now made. As seen in Fig. 3, gears 8 are mounted in a bottom portion 11 of course ring 3 by means of a shaft 12 in engagement with ball bearings 13. This leaves these gears free to rotate within ring 3. Similarly, it will be seen that gears 7 are also affixed to course ring 3 and are also free to rotate. It should also be noted that belt 5 is disposed within a fixed shaft 14 and that the inner portion 11 of course ring 3 rotates upon a ball bearing rack 15 around shaft 14, there being a slip fit between shaft 14 and element 11. From the foregoing description, it will be clear that ring 3 is free to rotate around belt 5, thereby causing gears 8 (and wheels 6 therewithin) and gears 9 to revolve about the center point of this belt. This revolution of wheels 6, however, still leaves them free to rotate about their own axes.

Referring now more particularly to Fig. 2, the operation of this portion of the invention will now be described. A disk, 1 not shown in this figure, for reasons of clarity, is placed over the entire apparatus with the north-south axis of the chart thereupon being in the same plane as the direction of rotation of belt 5. Disk 1 is held against belt 5 by magnets 4, and the rotation of belt 5 causes the disk to move in, let us assume, a downward direction. Now let us assume that course ring 3 is rotated clockwise through a given angle. Gear 7 remains fixed; however, it will be apparent that the rotation of course ring 3 will cause gears 9 to revolve around the center point of belt 5 and simultaneously cause them to rotate in a clockwise direction. This clockwise rotation of gears 9 will cause them to rotate gears 8 in a counterclockwise direction. It should be noted that due to the rotation of course ring 3, without gears 8 and 9, wheels 6 would no longer have been parallel to the direction of rotation of belt 5, and their rubber covered surfaces would have impeded the downward progress of disk 1 and destroyed the accuracy of the apparatus. However, due to gears 7, 8 and 9, the clockwise rotations of gears 9 cause gears 8 to rotate counterclockwise and maintain wheels 6 parallel with the direction of rotation of belt 5. The foregoing statement will hold true regardless of the angle through which course ring 3 may turn. From the foregoing description of Figs. 2 and 3, it will be apparent that a disk can be moved in accordance with any change in a vector quantity with extremely great accuracy.

Referring again to Fig. 1, there is shown in this figure the incorporation of the apparatus of Figs. 2 and 3 into an odograph recorder which may be carried on a craft. Belt 5 is driven through a gear box 16 and a belt 17 by a variable speed motor drive 18. Motor drive 18 is varied in speed by means of a control 19, such controls for changing the speeds of motors being well known in the art. Control 19 may be either manually or automatically adjusted to control the speed of motor 18 so that it is proportional to the speed of a craft or moving object, the craft speed corresponding to the length of the vector that it is desired to plot. An angular position or course motor drive is depicted at 21, such as a two-phase motor, and it is used to turn a gear 22 and thereby to rotate gear 23 which is coupled to course ring 3. Any rotation of gear 23 is transmitted through a gear 24 to a self synchronous motor 25. Such motors as 21 and 25 are of course well known in the art. Into motor 25 is also fed the output from a compass 26 which may be of the flux gate type shown in an article entitled "Aircraft Navigation Instruments," by W. L. Webb, in vol. 70, Electrical Engineering, page 384 (1951). Any suitable compass which gives an electrical output could be used as compass 26. Any difference in electrical output between self-synchronous motor 25 and compass 26 is caused to activate a servo-amplifier 27. Servo-amplifier 27 may be any of the well-known devices for transmitting differences between two electrical quantities. The output of servo-amplifier 27 is used to control the position of course motor drive 21. It will be apparent that motor drive 21 will be rotated until there is no difference between the output of self-synchronous motor 25 and compass 26; a condition that is attained when the north-south line on chart 2 is parallel with compass north-south. Putting it another way, course ring 3 will be turned for an angular distance equal to the azimuth of the craft course. It will be obvious from the foregoing description that merely placing a pen above the center point of belt 5 in contact with chart 2 will enable a trace to be made of the course of any craft bearing this instrument.

Referring now to Fig. 5, there is shown a suitable, thin marker pen 10 for use with the polar plotter shown in Figs. 1, 2 and 3. This pen 10 is connected to a long rod 28, which rod is urged downward by a spring 29 fastened to the chassis 31 of the odograph. The rod 28 is connected to a coil 32 which is axially movable about an iron core 33. Also surrounding core 33 is a coil 34 connected to a D.-C. source of potential, as indicated. By placing electrical signals indicating wind velocity or water temperature on a pair of leads going to coil 32, the coil 32 can be caused to move axially along the rod 33, thus moving pen 10 in accordance with this information. This figure represents a modification of the odograph pen in that the odograph can now depict information other than the course of a craft.

Referring now to Fig. 4 are shown three views of a typical course of a craft and how it is depicted upon the chart by using the present invention. In the top view, it will be seen that the point of pen 10 is directly over the center of belt 5 and that wheels 6 are parallel with the rotational plane of belt 5. This is the starting position of the craft whose course will be plotted and it is labelled A. In the center view, it will be seen from trace 35 that the craft has moved from the center of chart 2 in a southerly direction, and as indicated in this view the disk has moved downward in a northerly direction to a position B. Simultaneously, information as to water temperature has been recorded by moving the pen at right angles to the course trace of the craft. This was accomplished by a device shown in Fig. 5. In the bottom view, it will be seen from trace 36 that the craft has now altered its course and is moving in a southeasterly direction, and the chart is now in a position C. It will be noted that in this position wheels 6 are still parallel to the direction of rotation of belt 5. It will further be noted that other information as to water temperature in a new location has also been depicted.

It should be understood that the present invention is not limited to any specific type of gearing arrangement for causing the wheels 6 to turn the chart without impeding its progress, since other types of gearing arrangements will readily occur to those skilled in the art for accomplishing the same results. Moreover, it should also be understood that there are many other types of devices that could be used to replace that shown in Fig. 5 for moving the pen 10 at right angles to the course of the object whose course is being depicted. For example, any of the devices used to move a radio loudspeaker cone could replace that shown in Fig. 5 for moving pen 10. Further, it should be clear that no specific type of pen is necessary to practice this invention, provided only a pen small enough not to obscure the view of the operator is used. For example, an ordinary ink pen could be used, or an electrically heated pen which burns a trace into a heat sensitive chart could be used.

From the foregoing, it is believed apparent that a light weight, mechanically small and simple device has been disclosed for depicting a vector quantity. Further, the picture of the vector quantity is always visible to the operator of the invention.

While there has been described what is at present considered a preferred embodiment of the invention, it will be obvious to those skilled in the art that various changes and modifications may be made without departing from this invention; and it is aimed in the appended claims to cover all such changes and modifications as fall within the true spirit and scope of the invention.

What I claim as new and desire to secure by Letters Patent of the United States is:

1. In an apparatus for plotting in polar coordinate form a vector quantity that may vary in angle and magnitude, the combination comprising recorder means upon which said vector quantity is to be plotted, fixed marker means for making marks thereon, driving means completely separate from said marker means for moving said recorder means relative to said marker means through any changes in angle and magnitude of the vector quantity, said driving means including first means for engaging and moving said recorder means in a given direction only at a rate proportional to the magnitude of said vector quantity and second means for engaging and rotating said recorder means independently of said first means and said marker means for an angular distance equal to that of said vector quantity, and means to maintain said first and second means in a predetermined positional relationship while rotating said recorder means.

2. The apparatus of claim 1, wherein said second means includes a plurality of rotatable wheel means engaging said recorder means and revolvable about said first means and so geared thereto that their directions of rotation are always parallel with said given direction.

3. In an apparatus for plotting a vector quantity in polar coordinates, the combination comprising recorder means upon which said vector quantity is to be plotted, fixed marker means adjacent to one side of said recorder means for making marks thereon, first rotatable means completely separate from said marker means and positioned adjacent to the other side of said recorder means for moving said recorder means relative to said marker means in a given direction at a rate proportional to the magnitude of the vector quantity being plotted, and second rotatable means completely separate from said marker and said first means also positioned adjacent to the other side of said recorder means for rotating said recorder means about a given point for an angular distance equal to that of said vector quantity, and means coupling said first and second rotatable means to maintain them in a predetermined positional relationship while rotating said recorder means.

4. The apparatus of claim 3, further including means for moving said marker means at an angle with said given direction in accordance with other information it is desired to plot.

5. Apparatus for plotting in polar coordinate form a vector quantity that may vary in angle and length, comprising recorder means upon which said vector quantity is to be plotted, marker means adjacent to one side of said recorder means for making marks thereupon, first means completely separate from said marker means and adjacent to the other side of said recorder means for moving said recorder means relative to said marker means in a given direction at a rate proportional to the length of the vector quantity being plotted, and including fixedly positioned gear means, second means completely separate from said marker means and adjacent to the other side of said recorder means for rotating said recorder means about a given point for an angular distance equal to that of said vector quantity, said second means comprising a plurality of freely rotatable wheel means, each of said wheel means having a further gear means fixedly positioned about it, and said wheel means revolvable about said first means and so geared thereto that their directions of rotation are always parallel with said given direction.

6. An odograph for plotting the course of a moving object, comprising recorder means made of a magnetic material and carrying a course plotting chart on one side thereof, pen means adjacent to said chart for making marks thereupon and being urged into continuous contact therewith by spring means, motor driven means in contact with the other side of said recorder means at a given point for frictionally moving said recorder means relative to said pen means in a given direction, means for varying the speed of said motor driven means so that it moves said recorder means at a rate proportional to the speed of said moving object, a plurality of freely rotatable wheel means, and means mechanically coupling said rotatable wheel means and said motor driven means for revolving said wheel means so that their directions of rotation are always parallel with said given direction, said wheel means frictionally engaging said other side of said recorder means, magnet means for urging said other side of said recorder means into continuous contact with said motor driven means and said wheel means, motor means for revolving said wheel means about said given point for an angular distance from said given direction equal to that of the azimuth of the moving object, the revolution of said wheel means serving to rotate said recorder means about said given point, and means responsive to any difference in angular position between said recorder means and said moving object for causing said motor means to revolve said wheel means until no such difference is present.

7. The odograph of claim 6, said coupling means including gear means fixedly positioned about said given point, and a plurality of rotatable gears each in mesh with said gear means and adapted to be revolved about said given point together with said wheel means, said wheel means being geared to said rotatable gears and rotated thereby as said rotatable gears revolve together with said wheel means about said given point.

8. The apparatus of claim 7, further including means for moving said pen means at an angle with said given direction in accordance with other information it is desired to plot.

9. Apparatus for moving an object in accordance with a vector quantity that may vary in angle and length, comprising first means for moving said object in a given direction at a rate proportional to the length of said vector quantity, and second means for rotating said object about a given point for an angular distance equal to that of said vector quantity and including a plurality of rotatable wheel means engaging said object, and means mechanically coupling said rotatable wheel means and said first means for revolving said rotatable wheel means so that their directions of rotation are always parallel with said given direction.

10. Apparatus for moving a magnetic object in accordance with the vector quantity that may vary in angle and magnitude, comprising first means in frictional engagement with said magnetic object for moving said object in a given direction at a rate proportional to the magnitude of said vector quantity, second means for rotating said magnetic object about a given point for an angular distance equal to that of said vector quantity and including a plurality of rotatable wheel means, and means mechanically coupling said rotatable wheel means and said first means for revolving said rotatable wheel means so that their direction of rotation is always parallel with said given direction, said rotatable wheel means being frictionally engaged with said magnetic object, and magnet means for urging said magnetic object into continuous contact with said wheel means and said first means.

11. Apparatus for moving a magnetic object in accordance with a vector quantity that may vary in angle and length, comprising motor driven means in contact with said magnetic object for frictionally moving said magnetic object in a given direction, means for varying the speed of said motor driven means so that it moves said magnetic object at a rate proportional to the length of said vector quantity, a plurality of freely rotatable wheel means, and means mechanically coupling said rotatable wheel means and said motor driven means for revolving said rotatable wheel means so that their directions of rotation are always parallel with said given direction, said wheel means being in frictional engagement with said magnetic object, magnet means for urging said magnetic object into continuous contact with said motor driven means and said wheel means, motor means for revolving said wheel means about a given point for an angular distance from said given direction equal to that of said vector quantity, the revolution of said wheel means serving to rotate said magnetic object about said given point, and means responsive to any difference in angular position between said magnetic object and said vector quantity for causing said motor means to revolve said wheel means until no such difference is present.

12. The apparatus of claim 11, said coupling means including gear means fixedly positioned about said given point, and a plurality of rotatable gears each in mesh with said gear means adapted to be revolved about said given point together with said wheel means, said wheel means being geared to said gears and rotated thereby as said gears revolve together with said wheel means about said given point.

13. An odograph for plotting the course of a moving object, comprising a recorder means upon which said course is plotted, marker means adjacent to one side of said recorder means and in continuous contact therewith for making marks thereon, first driving means completely separate from said marker means for engaging and moving said recorder means in a given direction relative to said marker means at a rate proportional to the speed of said moving object, second driving means completely separate from said marker and said first driving means for engaging and rotating said recorder means about a given point for an angular distance from said given direction equal to the azimuth of the moving object, said second means including driving means responsive to any difference in angular position between said recorder means and said object for rotating said recorder means until said difference is reduced to zero, and gear means coupling said first and second driving means to maintain said second driving means parallel to said given direction of movement of said recorder while rotating said recorder means.

14. The odograph of claim 13 wherein said second means includes a plurality of rotatable wheel means, each of said wheel means having further gear means fixedly positioned about it and coupled to said fixedly positioned gear means, and said wheel means coupled to said driving means and revolvable about said first means, said wheel means being so geared to said first means that their direction of rotation is always parallel to said given direction.

15. The odograph of claim 14, further including means for varying the rotational speed of said first means so that it is proportional to the speed of said moving object.

16. The apparatus of claim 15, further including means for moving said marker means at an angle to said given direction in accordance with additional information it is desired to plot.

References Cited in the file of this patent

UNITED STATES PATENTS

| | | |
|---|---|---|
| 30,528 | Collier | Oct. 30, 1860 |
| 1,427,267 | De Lavaud | Aug. 29, 1922 |
| 1,453,377 | Campbell | May 1, 1923 |
| 2,369,922 | Shamah | Feb. 20, 1945 |
| 2,450,421 | Crane | Oct. 5, 1948 |
| 2,546,888 | Duffin | Mar. 27, 1951 |
| 2,582,374 | Dalke | Jan. 15, 1952 |
| 2,649,781 | Clewell | Aug. 25, 1953 |
| 2,727,801 | Skillman | Dec. 20, 1955 |